US011787059B2

United States Patent
Toris et al.

(10) Patent No.: US 11,787,059 B2
(45) Date of Patent: *Oct. 17, 2023

(54) METHOD AND SYSTEM FOR SELECTING A PREFERRED ROBOTIC GRASP OF AN OBJECT-OF-INTEREST USING PAIRWISE RANKING

(71) Applicant: Fetch Robotics, Inc., San Jose, CA (US)

(72) Inventors: Russell Toris, San Jose, CA (US); Sarah Elliott, Mountain View, CA (US); David Kent, Atlanta, GA (US)

(73) Assignee: Zebra Technologies Corporation, Lincolnshire, IL (US)

(*) Notice: Subject to any disclaimer, the term of this patent is extended or adjusted under 35 U.S.C. 154(b) by 302 days.

This patent is subject to a terminal disclaimer.

(21) Appl. No.: 17/114,490

(22) Filed: Dec. 7, 2020

(65) Prior Publication Data

US 2021/0086362 A1 Mar. 25, 2021

Related U.S. Application Data

(63) Continuation of application No. 16/191,178, filed on Nov. 14, 2018, now Pat. No. 10,899,011.

(60) Provisional application No. 62/585,678, filed on Nov. 14, 2017.

(51) Int. Cl.
*B25J 9/16* (2006.01)

(52) U.S. Cl.
CPC .......... *B25J 9/1682* (2013.01); *B25J 9/1612* (2013.01); *B25J 9/1661* (2013.01); *B25J 9/1664* (2013.01)

(58) Field of Classification Search
CPC ...... B25J 9/1612; B25J 9/1661; B25J 9/1664; B25J 9/1682
USPC .......................................................... 700/245
See application file for complete search history.

(56) References Cited

U.S. PATENT DOCUMENTS

| | | | | |
|---|---|---|---|---|
| 6,075,823 | A * | 6/2000 | Sonoda | H04B 7/0851 375/267 |
| 6,189,005 | B1 * | 2/2001 | Chakrabarti | G06F 16/2477 |
| 8,386,079 | B1 * | 2/2013 | Kohler | G06N 3/008 700/250 |
| 9,095,978 | B2 * | 8/2015 | Shi | B25J 9/0096 |
| 9,333,649 | B1 * | 5/2016 | Bradski | G06T 19/003 |
| 9,616,568 | B1 * | 4/2017 | Russell | B25J 19/02 |
| 9,649,764 | B1 * | 5/2017 | Sun | B25J 13/025 |
| 9,669,543 | B1 * | 6/2017 | Stubbs | B25J 9/1612 |
| 10,131,051 | B1 * | 11/2018 | Goyal | B25J 9/1697 |

(Continued)

FOREIGN PATENT DOCUMENTS

| | | | | |
|---|---|---|---|---|
| CN | 109033920 A | * | 12/2018 | ......... G06K 9/00214 |
| EP | 1645374 A1 | * | 4/2006 | ............ B25J 13/082 |
| WO | WO-2017197037 A1 | * | 11/2017 | ............ B25J 19/021 |

*Primary Examiner* — B M M Hannan

(57) ABSTRACT

A method for selecting a preferred robotic grasp of an object-of-interest using pairwise ranking includes: identifying a robotic candidate grasp usable to grasp the object-of-interest, the object-of-interest situated in an environment; receiving a grasp preference for a preferred candidate grasp of the object-of-interest; calculating a heuristic to describe a relationship of the candidate grasp to one or more of the object-of-interest and the environment; and using the heuristic and using the grasp preference, computing a pairwise ranking of two candidate grasps to determine an ordering of the at least two candidate grasps.

71 Claims, 7 Drawing Sheets

(56) References Cited

U.S. PATENT DOCUMENTS

| | | | |
|---|---|---|---|
| 10,275,543 B1* | 4/2019 | Edsinger | G06F 30/00 |
| 11,173,602 B2* | 11/2021 | Odhner | B25J 19/021 |
| 2006/0012198 A1* | 1/2006 | Hager | B25J 9/1612 |
| | | | 294/106 |
| 2010/0004778 A1* | 1/2010 | Arimatsu | G06T 1/0014 |
| | | | 700/214 |
| 2010/0138373 A1* | 6/2010 | Resende | G06F 17/11 |
| | | | 706/46 |
| 2016/0167227 A1* | 6/2016 | Wellman | B65G 1/10 |
| | | | 901/3 |
| 2017/0252922 A1* | 9/2017 | Levine | B25J 9/1612 |
| 2017/0252924 A1* | 9/2017 | Vijayanarasimhan | |
| | | | G06N 3/0454 |
| 2018/0232052 A1* | 8/2018 | Chizeck | G06T 7/97 |
| 2019/0026537 A1* | 1/2019 | Arisoy | G06N 20/00 |
| 2019/0196436 A1* | 6/2019 | Nagarajan | B25J 9/163 |
| 2019/0210223 A1* | 7/2019 | Goldberg | G06T 17/20 |
| 2020/0019864 A1* | 1/2020 | Gu | G05B 19/4183 |
| 2020/0147798 A1* | 5/2020 | Toris | B25J 9/1682 |
| 2020/0156244 A1* | 5/2020 | Li | B25J 13/087 |
| 2020/0198130 A1* | 6/2020 | Goldberg | B25J 9/1697 |

* cited by examiner

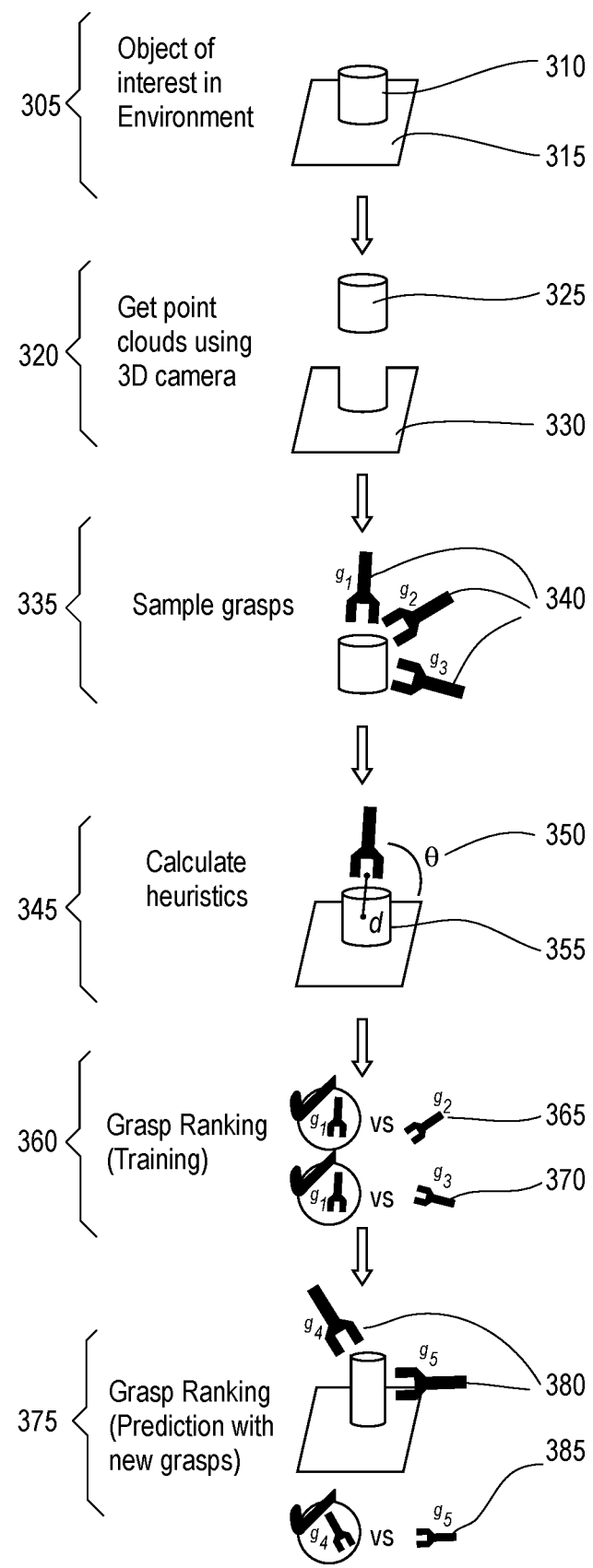

METHOD AND SYSTEM FOR SELECTING A PREFERRED ROBOTIC GRASP OF AN OBJECT-OF-INTEREST USING PAIRWISE RANKING

PRIORITY CLAIM

The present application claims the priority benefit of U.S. provisional patent application No. 62/585,678 filed Nov. 14, 2017 and entitled "Method and System for Pairwise Ranking and Pointwise Ranking for Autonomous Grasp Selection," the disclosure of which is incorporated herein by reference.

SUMMARY

Embodiments of the invention relate in general to a method for selecting a preferred grasp of an object-of-interest using pairwise ranking.

More specifically, embodiments of the invention relate in general to a method for selecting a preferred robotic grasp of the object-of-interest using pairwise ranking.

Even more specifically, embodiments of the invention relate to a method for automatically selecting a preferred robotic grasp of the object-of-interest using pairwise ranking.

A method for selecting a preferred robotic grasp of an object-of-interest using pairwise ranking includes: identifying a robotic candidate grasp usable to grasp the object-of-interest, the object-of-interest situated in an environment; receiving a grasp preference for a preferred candidate grasp of the object-of-interest; calculating a heuristic to describe a relationship of the candidate grasp to one or more of the object-of-interest and the environment; and using the heuristic and using the grasp preference, computing a pairwise ranking of two candidate grasps to determine an ordering of the at least two candidate grasps.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIG. 3 is a schematic flow diagram showing a method for selecting a preferred robotic grasp of an object-of-interest using pairwise ranking.

DETAILED DESCRIPTION

Figure 1:
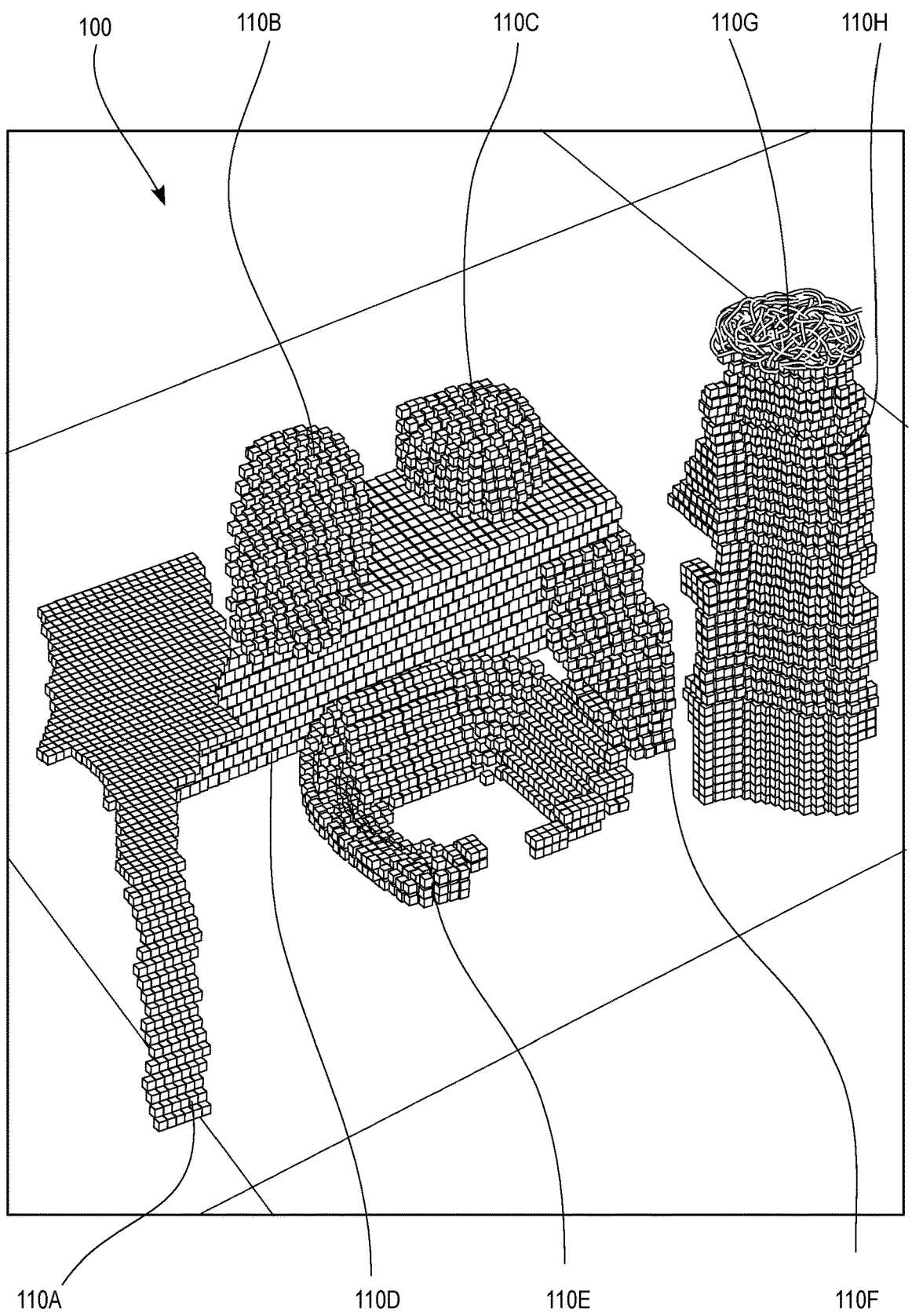
FIG. 1 is a drawing showing an example of an object point cloud ($PC_O$) that comprises features of a variety of objects used by a system and method for selecting a preferred robotic grasp of an object-of-interest using pairwise ranking.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

An object-of-interest is to be grasped by a robot comprising a robotic manipulator. For example, the robotic manipulator comprises one or more of a robotic hand and a vacuum gripper. A robotic grasp is defined as a position of the robotic manipulator that grips the object-of-interest.

The robotic manipulator grasps the object-of-interest using at least one object-of-interest grasp point, with the grasp being described using grasp information. For example, the grasp information comprises one or more of the grasp point and a grasp orientation. The grasp orientation is loosely defined as an angle of approach of the grasp. The grasp orientation describes an orientation while grasping the object-of-interest of the robotic manipulator. For example, the grasp orientation comprises one or more of a roll angle, a pitch angle, and a yaw angle. For example, the grasp orientation comprises each of a roll angle, a pitch angle, and a yaw angle. For example, the object-of-interest comprises the grasp point. Alternatively, a grasp could be represented using dimensions of the robotic manipulator and a rotation angle of at least one joint of the robotic manipulator.

Embodiments of the invention relate in general to a method and system for pairwise ranking for automatic grasp selection. Embodiments of the invention relate in general to a method and system for pairwise ranking for automatic selection of a preferred robotic grasp of an object-of-interest.

Embodiments of the invention provide a pairwise ranking approach to automatic selection of a preferred grasp of an object-of-interest-of-interest. We formulate grasp selection as a pairwise ranking problem using grasp heuristics as grasp vectors, augmented with object-of-interest features for context. Pairwise ranking comprises determining the overall rank of a candidate grasp by performing a series of pairwise comparisons of a first candidate grasp against a second candidate grasp. As shown below in FIGS. 5 and 6, the inventive pairwise ranking approach outperforms prior art state-of-the-art grasp calculation baselines.

A grasp selection method is provided that calculates and ranks a set of grasps according to user grasp preferences. User grasp preferences are used to rank grasps. For example, candidate grasps are excluded that do one or more of collide with the environment and come within a user-specified margin of colliding with the environment. For example, the environment comprises one or more of a table and a wall. For example, the margin comprises one or more of a percentage and a distance. Typically a user prefers a candidate grasp that is approximately perpendicular to a large surface in the environment such as a table or a wall.

For example, the grasp preference comprises one or more of a preference to grasp a center of the object-of-interest, a preference to grasp a handle of the object-of-interest, a preference to grasp a side of the object-of-interest, a preference for a candidate grasp approximately perpendicular to a large surface in the environment, a preference to exclude a candidate grasp that does one or more of collide with the environment and come within a user-specified margin of colliding with the environment. For example, wherein the margin comprises one or more of a percentage and a distance.

The method comprises three principal steps: 1) grasp sampling is performed to identify initial candidate grasps, then 2) heuristics are calculated to describe a candidate grasp's relationship to one or more of an object-of-interest and an environment surrounding the object-of-interest, and then 3) pairwise ranking of the candidate grasps is performed to determine an ordering of the candidate grasps. For example, a heuristic is calculated to describe a relationship of each candidate grasp to one of more of the object-of-interest and the environment. For example, a heuristic is calculated to describe a relationship of each grasp to the object-of-interest. For example, a heuristic is calculated to describe a relationship of each grasp to the environment. For example, a heuristic is calculated to describe a relationship of a candidate grasp to the object-of-interest, wherein the heuristic further describes a relationship of the candidate grasp to the environment.

A. Grasp Sampling

In the grasp sampling step, the user provides input regarding a set of candidate grasps for the object-of-interest. Using the grasp sampling strategy, embodiments of the invention generate candidate grasps.

FIG. 1 is a drawing showing an example of a point cloud ($PC_O$) 100 that is usable to compute features of a variety of objects-of-interest 110A-110H used by a system and method for selecting a preferred robotic grasp of an object-of-interest using pairwise ranking. A grasp sampling strategy generates candidate grasps for an object-of-interest using a point cloud of the object-of-interest, $PC_O$ 100. A point cloud is a set of data points in three-dimensional space. The points in the $PC_O$ 100 define a shape of the object-of-interest 110A-110H. The $PC_O$ 100 can be used to compute features of the object-of-interest.

Embodiments of the invention do not require a specific grasp sampling strategy. Embodiments of the invention are designed for use with any method that can analyze a point cloud to produce a set of candidate grasps. For example, the grasp sampling strategy comprises one or more of a height accumulated feature sampler, a handle-like sampler, and an antipodal grasp sampler. For example, an antipodal grasp sampler included in the Agile grasp Robot Operating System (ROS) (www.ros.org) package can be used to populate the initial candidates. For example, another grasp sampler is used.

B. Heuristic Calculation

A heuristic is defined as a descriptor of a candidate grasp that is usable as a criterion for evaluating a candidate grasp. For example, a heuristic comprises a grasp orientation. For example, a heuristic is usable on its own or in combination with other heuristics to determine a preferred candidate grasp based on user grasp preferences. To calculate a heuristic, one or more of context data provided by a user, the candidate grasp, the object-of-interest, and the environment are processed to generate the heuristic information.

The heuristic calculation takes two point clouds as input, the object-of-interest point cloud ($PC_O$) comprising one or more of an object point in the object-of-interest and an object color of the object-of-interest point, and an environment point cloud ($PC_E$) comprising one or more of an environment point in the environment in which the object-of-interest is situated and an environment point color of the environment point.

The system computes object features using the $PC_O$. For example, the object feature comprises one or more of a size, a shape, a color, a surface texture, a label of the object-of-interest, a surface feature of the object-of-interest, a color histogram, a point feature histogram, and another feature of the object-of-interest.

The system computes environment features using the $PC_E$. For example, the environment feature comprises one or more of a size, a shape, a color, a surface texture, a label of the environment, a surface feature of the environment, a color histogram, a point feature histogram, and another feature of the environment.

Using the candidate grasps and the two point clouds, according to embodiments of the invention, the system computes a heuristic that describes a relationship of a candidate grasp to one or more of the object-of-interest and the surrounding environment. For example, the heuristic describes the relationship of the candidate grasp to the object-of-interest, and the heuristic also describes the relationship of the candidate grasp to the surrounding environment. For example, computing comprises finding a grasp characteristic describing a salient aspect of the grasp preference. For example, the grasp characteristic comprises one or more of a preference to grasp a center of the object-of-interest, a preference to grasp a handle of the object-of-interest, a preference to grasp a side of the object-of-interest, a preference for a candidate grasp approximately perpendicular to a large surface in the environment, a preference to exclude a candidate grasp that does one or more of collide with the environment and come within a user-specified margin of colliding with the environment. For example, the margin comprises one or more of a percentage and a distance.

For example, the heuristic comprises an orientation of the candidate grasp relative to the object-of-interest. For example, the heuristic comprises an orientation of the candidate grasp as the robot grasps the object-of-interest at a grasp point.

According to further embodiments of the invention, one or more of the following heuristics is used:

$h_1$: difference between the candidate grasp orientation and a normal to a principal plane of the environment. For example, the principal plane of the environment is fit over $PC_E$. The $h_1$ heuristic ensures that better candidate grasps are approximately perpendicular to large planes in the environment, such as table surfaces or shelf walls.

$h_2$: difference between the grasp orientation and a normal to a principal plane of the object-of-interest. For example, the principal plane of the object-of-interest is fit over a local region of $PC_O$ centered at the grasp point. This heuristic ensures that better candidate grasps are approximately perpendicular to the object-of-interest.

$h_3$: difference between the candidate grasp orientation and the principal directions of $PC_O$. The principal directions of $PC_O$ indicate the main directions or axes along which points in $PC_O$ are aligned. For example, for a water bottle, one principal direction would be along a vertical line from the bottom of the bottle through the cap. Many of the points that make up the bottle lie along that line. In general it is effective to grasp the bottle along that line. This heuristic ensures that better candidate grasps will be substantially aligned with the object-of-interest.

$h_4$: distance between the grasp point and the center of $PC_O$, preferring candidate grasps near a center of the object-of-interest.

$h_5$: distance between the grasp point and the nearest point in $PC_O$. This heuristic deters candidate grasps that were erroneously sampled from the environment rather than the object-of-interest. This heuristic also ensures that candidate grasps centered on a point touching the object-of-interest are preferred over candidate grasps centered on a point not touching the object-of-interest.

According to other embodiments of the invention, at least one heuristic is normalized on [0, 1], that is, the value of the heuristic is scaled. For example, the heuristic is scaled to be between 0 and 1. Preferably, each heuristic is normalized on [0, 1]. For a candidate grasp i, according to embodiments of the invention, a combined heuristic value $h_i$ can be computed to approximate the candidate grasp's quality using a linear combination of the candidate grasp's heuristics:

$$h_i = w_1 h_i^1 + w_2 h_i^2 + w_3 h_i^3 + w_4 h_i^4 + w_5 h_i^5, \quad (1)$$

where $0 \leq w_n \leq 1$ and $\Sigma_n w_n = 1$

For example, when grasping a small object-of-interest such as a pen from a desk, embodiments of the invention prioritizes $h_1$ over $h_4$, since it is more important that a successful grasp be approximately perpendicular to the desk than that the center of the pen be grasped. Other embodiments of the invention prioritize other heuristics over $h_1$ because for grasping a large object-of-interest, relationships between the candidate grasp and the object-of-interest are more important than an orientation of the candidate grasp with respect to the environment. Embodiments of the invention represent an importance of a heuristic $h_i$ to the user by a different weight $w_i$ in equation (1). According to further embodiments of the invention, a pairwise ranking model compares the above grasp heuristics differently based on context provided by features of the object-of-interest.

C. Grasp Ranking

Embodiments of the invention use information retrieval methods to calculate a candidate grasp ranking. Given a search query, the candidate grasp ranking estimates an optimal ordering of returned items. For example, in the case of candidate grasp ranking, the search query is the object-of-interest itself, and the returned items are ranked candidate grasps.

According to further embodiments of the invention, a pairwise ranking model is provided to facilitate practical data collection.

Figure 2:
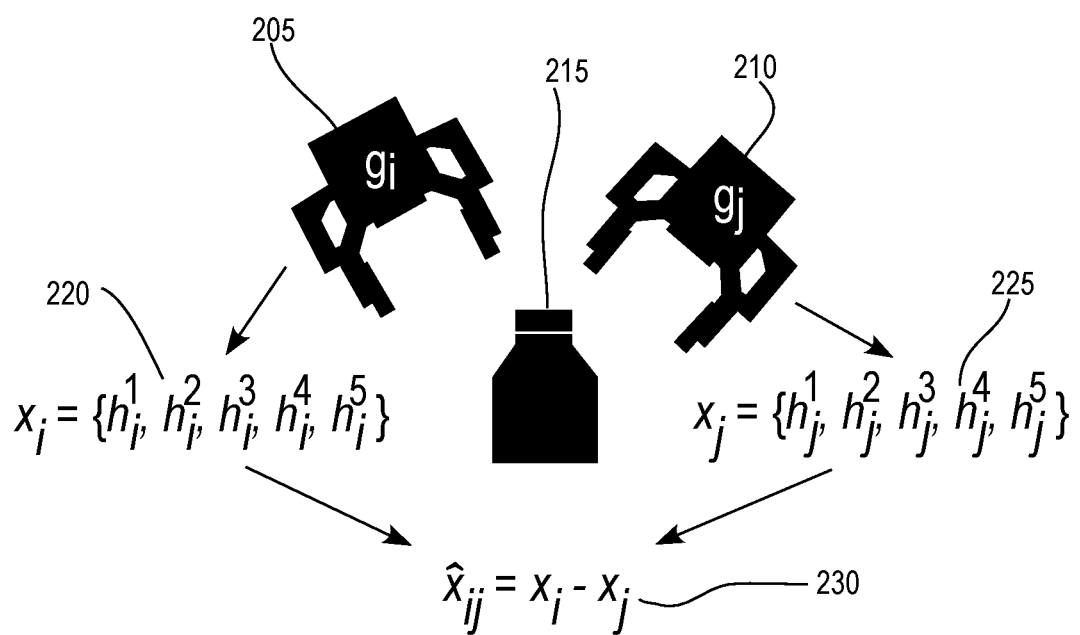
FIG. 2 is a drawing schematically illustrating a method for selecting a preferred robotic grasp of an object-of-interest using pairwise ranking.

FIG. 2 is a drawing schematically illustrating a method 200 for pairwise ranking for automatic robotic grasp selection.

Our example considers a pair of candidate grasps $g_i$ and $g_j$ (205 and 210), intended to grasp an object-of-interest 215 represented by respective grasp vectors $x_i = \{h_i^1, h_i^2, h_i^3, h_i^4, h_i^5\}$ and $x_j = \{h_j^1, h_j^2, h_j^3, h_j^4, h_j^5\}$ (220 and 225). The grasp vectors comprise grasp characteristics of the grasp in relation to one or more of the object-of-interest and the environment. The invention calculates a pairwise vector 230 $\hat{x}_{ij}$ by taking a difference of the grasp vectors:

$$\hat{x}_{ij} = \{x_i - x_j\}. \quad (2)$$

The pairwise vector 230 $\hat{x}_{ij}$ represents a difference between grasp characteristics of two candidate grasps. The pairwise vector 230 $\hat{x}_{ij}$ indicates, for each of the five heuristics ($h_1$, $h_2$, $h_3$, $h_4$, and $h_5$) how the candidate grasps differ. For example, the pairwise vector $\hat{x}_{ij}$ indicates which candidate grasp out of the pair is closer to the center of the object-of-interest.

Next, according to embodiments of the invention, an object vector is computed from the object point cloud $PC_O$. The object vector $f_{ij}$ is a vector comprising object-of-interest features $f_0, f_1, \ldots, f_n$:

$$f_{ij} = \{f_0, f_1, \ldots, f_n\} \quad (3)$$

For example, embodiments of the invention use as an object-of-interest feature one or more of an average color of the object-of-interest and dimensions of a bounding box around the object-of-interest.

Next, according to further embodiments of the invention, the pairwise vector $\hat{x}_{ij}$ computed in the first step is appended to the object vector $f_{ij}$, creating an enhanced vector $x_{ij}$. The enhanced vector $x_{ij}$ contains information comparing two candidate grasps and relating them to the object-of-interest.

$$x_{ij} = \{f_0, f_1, \ldots, f_n, x_{ij}\} \quad (4)$$

According to embodiments of the invention, a grasp preference label $y_{ij}$ is generated that denotes an ordering of the two candidate grasps $g_i$ 205 and $g_j$ 210, wherein a grasp preference label $y_{ij}$ of 1 indicates a grasp preference for $g_i$ over $g_j$, and a grasp preference label $y_{ij}$ of 0 indicates a grasp preference for $g_j$ over $g_i$.

Using the grasp preference label $y_{ij}$ according to embodiments of the invention, a training pair $(x_{ij}, y_{ij})$ is generated reflecting user grasp preferences. The training pair $(x_{ij}, y_{ij})$ comprises the grasp preference label $y_{ij}$ and further comprises the enhanced vector $x_{ij}$:

$$(x_{ij}, y_{ij}) \text{ where } y_{ij} = \begin{cases} 1 \text{ if } g_i < g_j \\ 0 \text{ if } g_j < g_i \end{cases} \quad (5)$$

where a grasp preference label $y_{ij}$ of 1 indicates that the user prefers $g_i$ 205 over $g_j$ 210 and a grasp preference label $y_{ij}$ of 0 indicates that the user prefers $g_j$ 210 over $g_i$ 205. The addition of the grasp preference label $y_{ij}$ allows the invention to store which candidate grasp is preferred out of the two being compared by the enhanced vector $x_{ij}$. The pair $(x_{ij}, y_{ij})$ now contains the grasp preference describing the difference between two candidate grasps, relating them to the object-of-interest 215 and then denoting which is the preferred candidate grasp. Embodiments of the invention use the training pairs $(x_{ij}, y_{ij})$ to train a binary classifier to predict a candidate grasp ordering.

Once the binary classifier is trained, the system can be used to predict a pairwise ranking for a candidate grasp of a novel object. Provided with candidate grasps, the system will compute the enhanced vector $x_{ij}$, and then the binary classifier will predict the grasp preference label $y_{ij}$ denoting which candidate grasp is preferred.

Basically the pairwise ranking is always based on user grasp preferences. Initially during training the user is doing the pairwise ranking themselves manually. And then after the training, the method now has a binary classifier that was trained using the user's grasp preferences that will do the pairwise ranking itself without further user input, barring changes in the user's grasp preferences.

FIG. 3 is a schematic flow diagram showing a method for selecting a preferred robotic grasp of an object-of-interest using pairwise ranking. In step 305, an object-of-interest 310 is presented. The object-of-interest 310 comprises a cylindrical can 310. The object-of-interest is situated in an environment 315. As depicted, the environment 315 comprises a table 315.

In step 320, the object-of-interest 310 and the environment 315 are represented by respective point clouds. An object-of-interest point cloud ($PC_O$) 325 is generated to represent the object-of-interest 310. An environment point cloud ($PC_E$) 330 is generated to represent the environment 315. For example, one or more of a stereo camera and a time-of-flight camera generates one or more of the $PC_O$ 325 and the $PC_E$ 330.

In step 335, a grasp sampling step, a grasp sampling strategy is provided with the point cloud of the object-of-interest and a set of candidate grasps 340 $g_1$, $g_2$, and $g_3$ is generated in order to grasp the object-of-interest 310. The point clouds are processed to obtain an object-of-interest features vector, {l, a, b, x, y, z}, from the object-of-interest, as set forth in more detail in FIG. 2.

For example, {l, a, b} is the average color of $PC_O$. The color is represented in the Commission Internationale de l'Eclairage Lab (CIELAB) color space rather than the RGB color space because the CIELAB color space has advantages for robotic applications including being device-independent. {x, y, z} are dimensions of a minimum-area bounding box containing $PC_O$. That is, {x, y, z} are dimensions of the smallest six-sided, rectangular bounding box that can be fit around $PC_O$. The object-of-interest feature comprises one or more of a size, a shape, a color, a surface texture, an object-of-interest label, an object-of-interest surface feature, a color histogram, a point feature histogram, and another feature.

In step 345, one or more heuristics is computed. For example, the heuristic comprises a grasp orientation 350. For example, the heuristic comprises one or more of $h_1$, $h_2$, $h_3$, $h_4$, and $h_5$. For example the heuristic comprises $h_4$ 355, the distance between the grasp point and the center of $PC_O$.

In step 360, the candidate grasps are ranked using user grasp preferences. Using pairwise ranking, two candidate grasps are compared directly. When giving input for our method, the user selects the preferred candidate grasp from a set of candidate grasps. This provides a pairwise comparison between the selected candidate grasp and all other candidate grasps. By selecting the first candidate grasp $g_1$ as the preferred candidate grasp, the user shows that per comparison 365, the user prefers the first candidate grasp $g_1$ to the second candidate grasp $g_2$. By selecting the first candidate grasp $g_1$ as the preferred candidate grasp, the user also shows that per comparison 370, the user prefers the first candidate grasp $g_1$ to the third candidate grasp $g_3$.

In step 375, the user grasp preference is used to predict a preferred candidate grasp from among new candidate grasps 380 $g_4$ and $g_5$ for which the user has not provided any grasp preference. Using the pairwise ranking method, the system determines that the fourth candidate grasp $g_4$ is predicted to be preferred by the user over the fifth candidate grasp $g_5$.

Data Collection Techniques: Embodiments of the invention using pairwise training data require only relative differences in grasp quality, not absolute values of grasp quality. This is advantageous as embodiments of the invention can collect training examples by having the user select a best candidate grasp from a list, without a requirement that the user provide a score or a grasp preference. The user selects the preferred candidate grasp out of n candidate grasps. The preferred candidate grasp is compared to each other candidate grasp to create training instances. When comparing two candidate grasps, two training examples are generated. This is because the candidate grasps are compared in both directions, i.e. $g_i$ vs. $g_j$ and then also $g_j$ vs. $g_i$. Further embodiments of the invention generate 2(n−1) pairwise instances, where n is the total number of candidate grasps, from a user's single candidate grasp selection. During training, each pairwise comparison generates a pair ($x_{ij}$, $y_{ij}$) as described above. 2(n−1) pairwise instances are created because $x_i$ is compared to $x_j$ to make one pair and then $x_j$ is compared to $x_i$ to form another pair. These pairwise comparisons would yield opposite values for the user grasp preference, y. Method 1 shows this feature of the invention in more detail.

Method 1 Pairwise Training Data Generation

```
Require: grasps, pc_o, pc_e
  1:    s ← userSelectedGraspIndex(grasps)
  2:    x ← calculateHeuristics(grasps, pc_o, pc_e)
  3:    objectFeatures ← calculateFeatures(pc_o)
  4:    for i = 0 : size(grasps) | i ≠ s do
  5:        saveTrainingInstance({objectFeatures, x_s − x_i}, 1)
  6:        saveTrainingInstance({objectFeatures, x_i − x_s}, 0)
  7:    end for
```

Producing a Ranked Candidate Grasp List: Yet further embodiments of the invention produce a final ranked candidate grasp list using in the computing step a voting method, shown in Method 2. For every permutation of two candidate grasps, embodiments of the invention use the binary random forest classifier to predict a pairwise ordering. Embodiments of the invention rank as a highest ranked candidate grasp the candidate grasp that was ordered first for the most pairs. Pairwise rankings are tabulated and a highest ranked candidate grasp comprises a candidate grasp that was a preferred candidate grasp in the highest number of pairwise rankings.

One advantage of this approach is that a voting formulation provides robustness to misclassifications from the binary classifier, as any misclassification has a chance to be mitigated by classifying the reverse-ordered pair (e.g. if $x_{ij}$ is classified as a false positive, $x_{ji}$ can still be classified as a true positive).

Method 2 Complete Pairwise Ranking

```
Require: pc_o, pc_e
  1:    grasps ← sampleAntipodalGrasps(pc_e)
  2:    x ← calculateHeuristics(grasps, pc_o, pc_e)
  3:    objectFeatures ← calculateFeatures(pc_o)
  4:    for all g_i, g_j in grasps | i ≠ j do
  5:        if classify({objectFeatures, x_i − x_j}) = 1 then
  6:            incrementRank(g_i)
  7:        else
  8:            incrementRank(g_j)
  9:        end if
 10:    end for
 11:    return sort(grasps)
```

The ranked candidate grasp list comprises feedback ranking data generated when a user performs one or more of selecting a candidate grasp, executing the candidate grasp, and ranking the candidate grasp, the feedback ranking data being applied to improve candidate grasp rankings. For example, selecting the candidate grasp and ranking the candidate grasp are a combined single operation.

For example, the system is configured to suggest to the user a highest ranking candidate grasp.

Figure 4A:
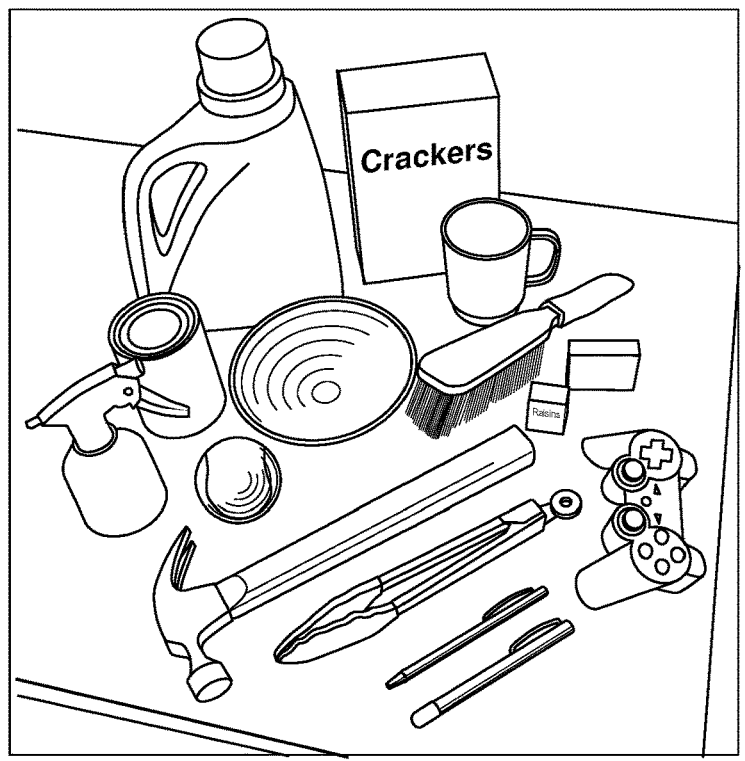
FIGS. 4A-4B is a set of two drawings of representative sets of objects, FIG. 4A showing a set of objects used by embodiments of the invention to collect grasp preferences, and FIG. 4B showing a set of objects that are novel and for which embodiments of the invention generate grasp preferences.
Figure 4B:
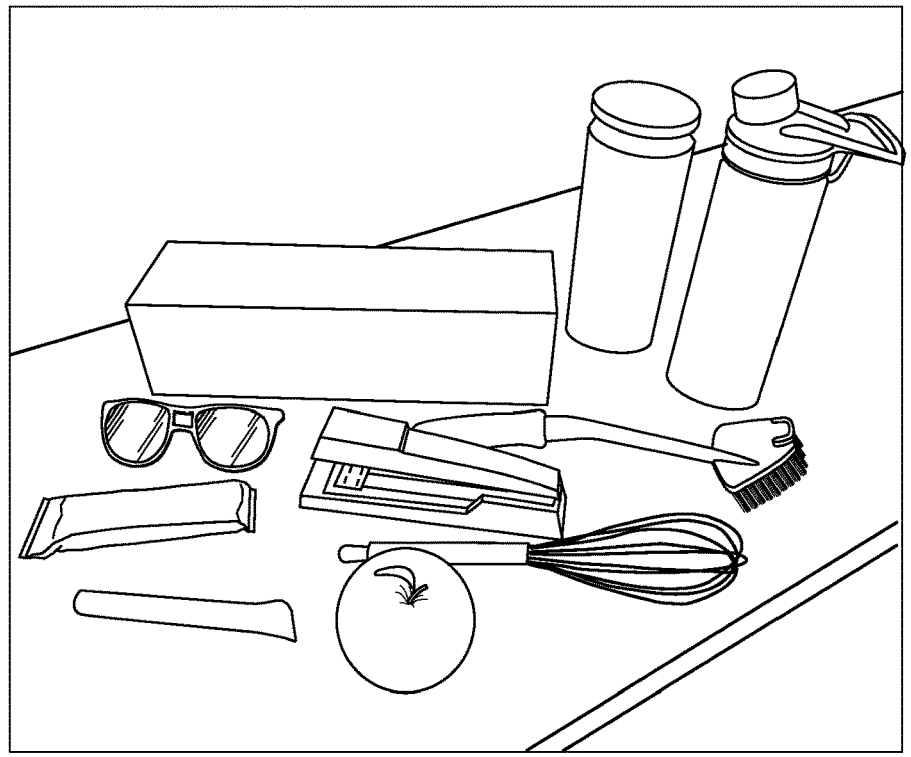

FIGS. 4A-4B is a set of two drawings of representative sets of objects, FIG. 4A showing a set of objects used by embodiments of the invention to collect grasp preferences, and FIG. 4B showing a set of objects that are novel and for which embodiments of the invention generate grasp preferences.

Embodiments of the invention collect grasp preferences using a diverse set of 15 objects, shown in FIG. 4A. For example, a graphical user interface (GUI) receives the user's grasp preference. For example, the GUI receives the context data. For example, receiving the context data comprises receiving one or more of the $PC_O$ and the $PC_E$. For example, receiving the context data comprises receiving one or more of the $PC_O$ and the $PC_E$ from one or more of a stereo camera and a time-of-flight camera.

The system generates grasp preferences by having a user virtually place an object-of-interest in an environment, for example, on a table. Then using the GUI, the system generates a visualization of a set of candidate grasps. For example, using the GUI, the system generates the set of candidate grasps using the grasp sampling strategy specified by the user, as outlined infra. Using the GUI, the user views this visualization of the set of candidate grasps. The system, using the GUI, then receives from the user a selection from the set of candidate grasps of a best candidate grasp of the object-of-interest in the environment. For example, this method is conducted multiple times for at least one object in a trained object set. For example, this method is conducted multiple times for each object in the trained object set. For example, this method is conducted four times for each object in the trained object set.

According to embodiments of the invention, the approach adapts its strategy depending on user grasp preferences.

Embodiments of the invention have the advantage of flexibility, as even when the user simply selects a decent candidate grasp instead of the optimal candidate grasp from the candidate list, the majority of training instances generated by embodiments of the invention will still correctly reflect the grasp preference.

3) Model Evaluation:

Using binary-labeled pairwise vectors, embodiments of the invention train a binary classifier using standard machine learning techniques. According to other embodiments of the invention, a set of models can be evaluated using embodiments of the invention to determine a best binary classifier for pairwise vectors. For example, the scikit-learn machine learning database can be used to analyze the data.

The random forest classifier resulted in a highest pair ordering prediction accuracy over the training data using 10-fold cross-validation of 0.93±0.01. Next best classifiers were the neural network classifier and the k nearest neighbors classifer, both with an accuracy of 0.91±0.01.

IV. Grasping Experiments and Evaluation of Same

Embodiments of the invention evaluate grasp success rates on a trained object set (over which the pairwise classifier was trained, as shown in FIG. 4A) and a set of novel objects (as shown in FIG. 4B) to examine the invention's potential for generalization.

Different methods of candidate grasp generation and ranking were compared in order to evaluate the invention. Alternative methods used for comparison include:

Random: Randomly select a candidate grasp from the list of antipodal candidate grasps with uniform probability.

Agile: Select a candidate grasp returned by the full Agile pipeline.

Select a highest-ranked candidate grasp using a heuristic-based pointwise ranking method, using Equation 1 as a heuristic, uniformly weighting each of the five heuristics.

Pairwise selection according to embodiments of the invention: Select the highest-ranked candidate grasp using the inventive pairwise ranking method as summarized by Method 2, and using as a classifier the binary random forest classifier trained on the full set of grasp preference training data described in the Data Collection Techniques section.

In an experiment to demonstrate operation of embodiments of the invention, embodiments of the invention used a robot to perform 16 controlled grasping trials per object at 4 preselected testing positions, with 4 preselected orientations at each position. This process was repeated for each of the four approaches. Since there are 15 objects in the set of trained objects (FIG. 4A), and ten in the novel object set (FIG. 4B), a total of 4 times 4 times 4 times (15+10)=1600 grasp executions.

A. Grasp Quality on Trained Objects

Figure 5:
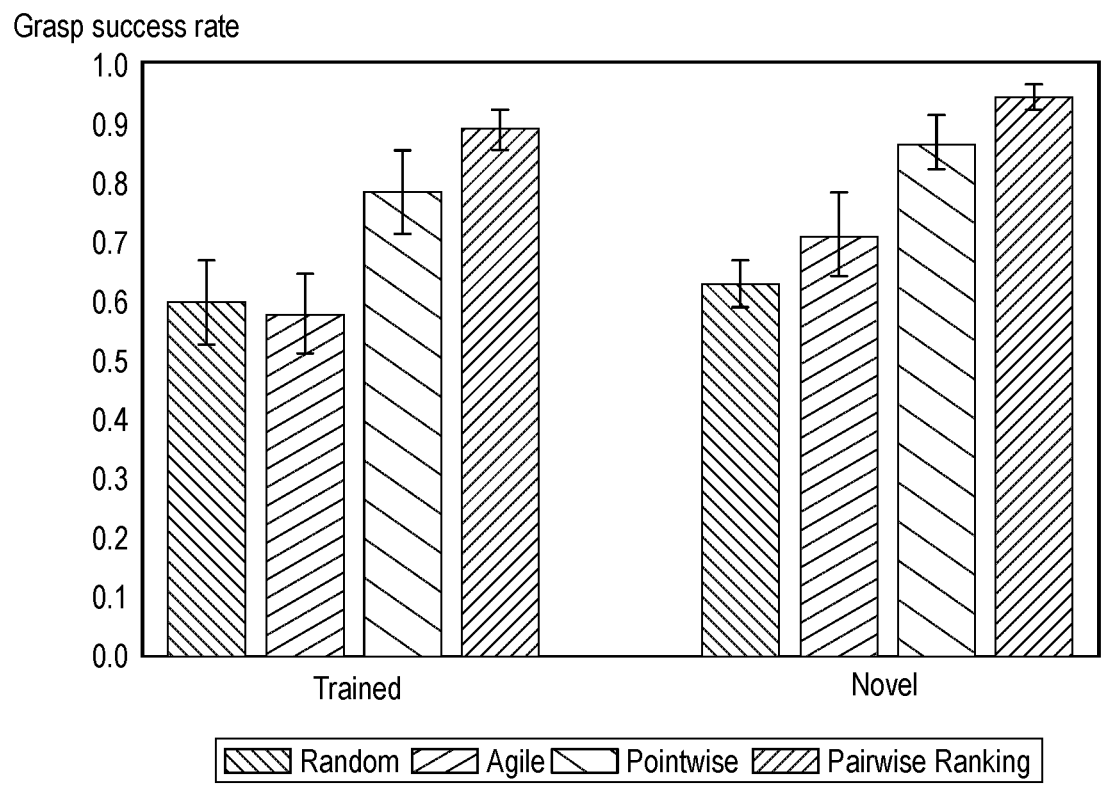
FIG. 5 is a plot of grasp success rates on both trained objects and novel objects using a prior art random approach, a prior art Agile approach, a prior art pointwise approach, and using a method of an object-of-interest selecting a preferred robotic grasp using pairwise ranking.

FIG. 5 is a plot of grasp success rates on both trained objects and novel objects using a prior art random approach, a prior art Agile approach, a prior art pointwise approach, and using embodiments of the invention. FIG. 5 shows that conducting post tests with Tukey's honest significant difference (HSD) test showed the pairwise method's grasp success rate according to embodiments of the invention provides a statistically significant improvement over the prior art random approach (p<0.01) and the prior art Agile approach (p<0.01). The pairwise method's grasp success rate also significantly improves on the prior art pointwise approach. Error bars denote ±1 standard deviation.

Table I shows the grasp success rates for all methods used in the training and then to generate FIG. 5, including the three prior art methods and pairwise ranking according to embodiments of the invention, on both trained and novel object sets, reported as a mean grasp success rate over all trials for the object set±1 standard deviation.

TABLE I

|  | Trained Set | Novel Set |
| --- | --- | --- |
| Random | 0.592 ± 0.073 | 0.625 ± 0.042 |
| AGILE | 0.575 ± 0.067 | 0.706 ± 0.072 |
| Heuristic | 0.779 ± 0.072 | 0.863 ± 0.045 |
| Pairwise | 0.883 ± 0.038 | 0.938 ± 0.021 |

Grasp success rates calculated over every object in the trained object set show the pairwise ranking approach according to embodiments of the invention to be the most effective method with a grasp success rate of 0.883±0.038, as shown in the first column of Table I. All grasp success rates are evaluated on a scale between 0.0 and 1.0. Embodiments of the invention outperform both the prior art random and the prior art state-of-the-art Agile baseline approaches.

The pairwise method's grasp success rate on trained objects was approximately 88%, improving on prior art methods by 13-49%. More specifically, the pairwise method improves on the prior art random approach by (0.883−0.592/0.592)=49%. Similar calculations show a relative improvement on trained objects over the prior art Agile approach of 54% and over the prior art pointwise approach of 13%. The pairwise method's grasp success rate on novel objects was approximately 94%, improving on the prior art methods by 50%, 33%, and 9%. Thus the range of improvements on novel objects was 9-50%. For both novel objects and for trained objects, embodiments of the invention using pairwise rankings perform better than any of the three prior art approaches.

Figure 6:
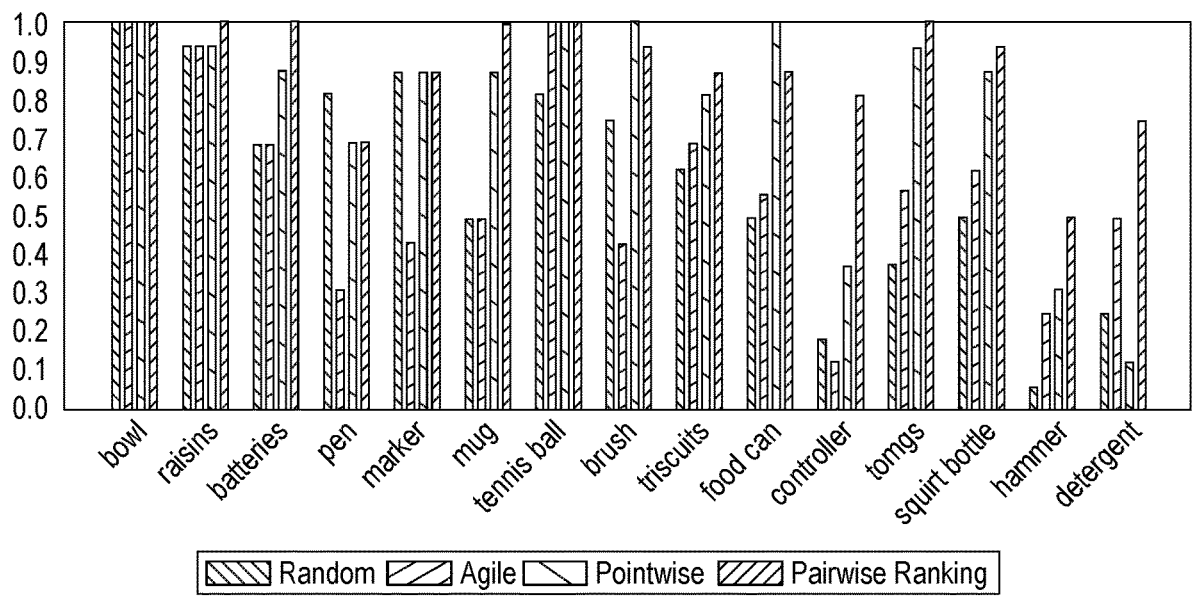
FIG. 6 is a plot of grasp success rates for each object in the trained object set using the prior art random approach, the prior art Agile approach, the prior art pointwise approach, and using the method of an object-of-interest selecting a preferred robotic grasp using pairwise ranking.

FIG. 6 is a plot of grasp success rates for each object in the trained object set using a prior art random approach, a prior art Agile approach, a prior art pointwise approach, and using embodiments of the invention. Examining grasp success rates for individual objects illustrates an advantage of the pairwise method according to embodiments of the invention. Embodiments of the invention attain grasp success rate improvements for objects that were the most difficult for the first three prior art methods. For consistent success, these difficult objects, e.g. the controller, hammer, and detergent, require very specific grasps. For example, these objects require one or more of correct alignment at a controller center, a candidate grasp close to a center of mass of the hammer, and on the handle of the detergent bottle) for consistent success. The pairwise method trains on object context-enhanced grasp vectors that can guide candidate grasp selection towards object-specific candidate grasps. By contrast, prior art methods fail.

Generalization to Novel Objects

To evaluate generalizability of the invention to novel objects, the same grasping experiment was carried according to embodiments of the invention using a new object set, without retraining the random forest classifier. The novel objects are shown in FIG. 4B.

The results, shown in the second column of Table I, show that pairwise ranking according to embodiments of the invention is the best method, with a grasp success rate of 0.938±0.021, better than all prior art methods. For both novel objects and for trained objects, one-way repeated Analysis of Variance (ANOVA) shows a statistically significant effect of grasp selection method on grasp success rate (F(3, 27)=25.44, p<0.0001) Tukey's HSD tests confirm that embodiments of the invention using pairwise rankings perform better by a statistically significant margin when compared to prior art random (p<0.01) and Agile (p<0.01) approaches, and also perform better than pointwise approaches.

Using the Method with a User Interface

Figure 7:
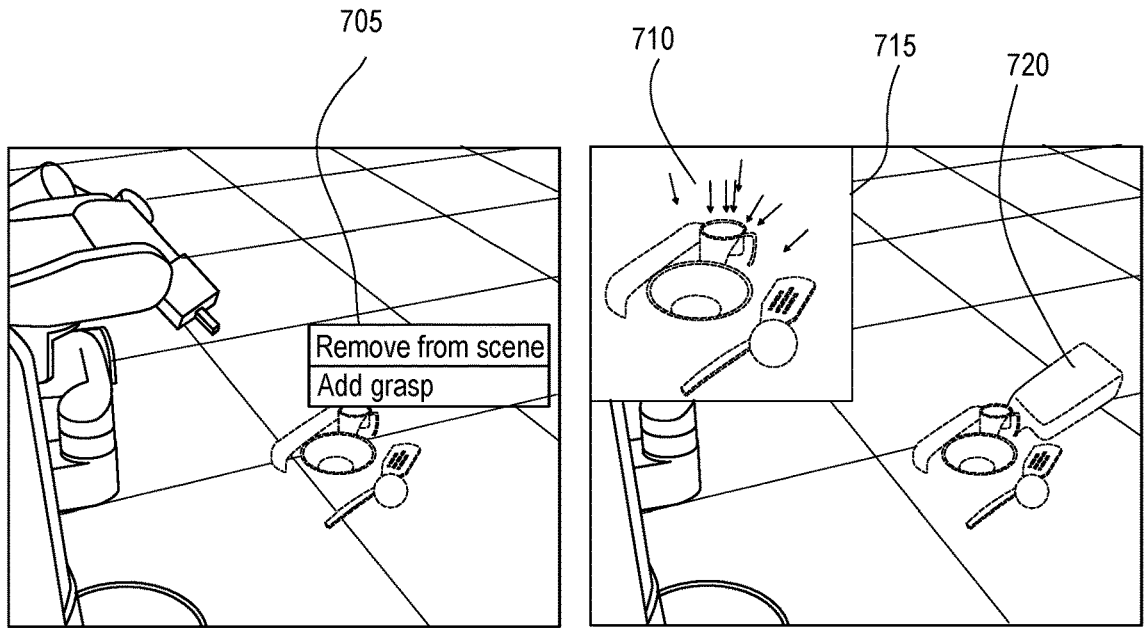
FIG. 7 depicts a user interface (UI) suitable for use with the method for selecting a preferred robotic grasp of an object-of-interest using pairwise ranking.

FIG. 7 depicts a user interface (UI) 700 suitable for use with the method and system for pairwise ranking for automatic robotic grasp selection.

The UI 700 facilitates a user's input of a grasp preference. According to embodiments of the invention, the user-input grasp preference is then used in training the system pursuant to the user's preferred candidate grasp.

The UI 700 shows an object-of-interest or set of objects-of-interest in an arbitrary configuration. The user right-clicks the object-of-interest to be grasped and selects the option 705 to generate grasps. This causes the method to generate a selection of possible candidate grasps for the object-of-interest. These are displayed as green arrows 710 in the grasp selection window 715.

The grasp selection window 715 is a window in the corner of the UI that is configured to receive a user's grasp preference. The grasp selection window 715 is configured to zoom in on the selected object-of-interest and display the candidate grasp suggestions as arrows. The shaft of the arrow shows the direction of the axis of rotation of the manipulator's wrist. The arrowhead points to the part of the object-of-interest that will be grasped. The user can click on an arrow to select a candidate grasp and a manipulator marker 720 will appear in the main UI window to show the position of the manipulator during execution of the candidate grasp. This allows the user to quickly view all of the generated candidate grasps and select an appropriate candidate grasp from many options.

The candidate grasp suggestions are based on the geometry of the object, so they do not rely on accurately detecting an object's pose. Each time a user executes a selected candidate grasp, the data is collected by the grasp ranking method and used to learn improved grasp rankings.

Figure 8:
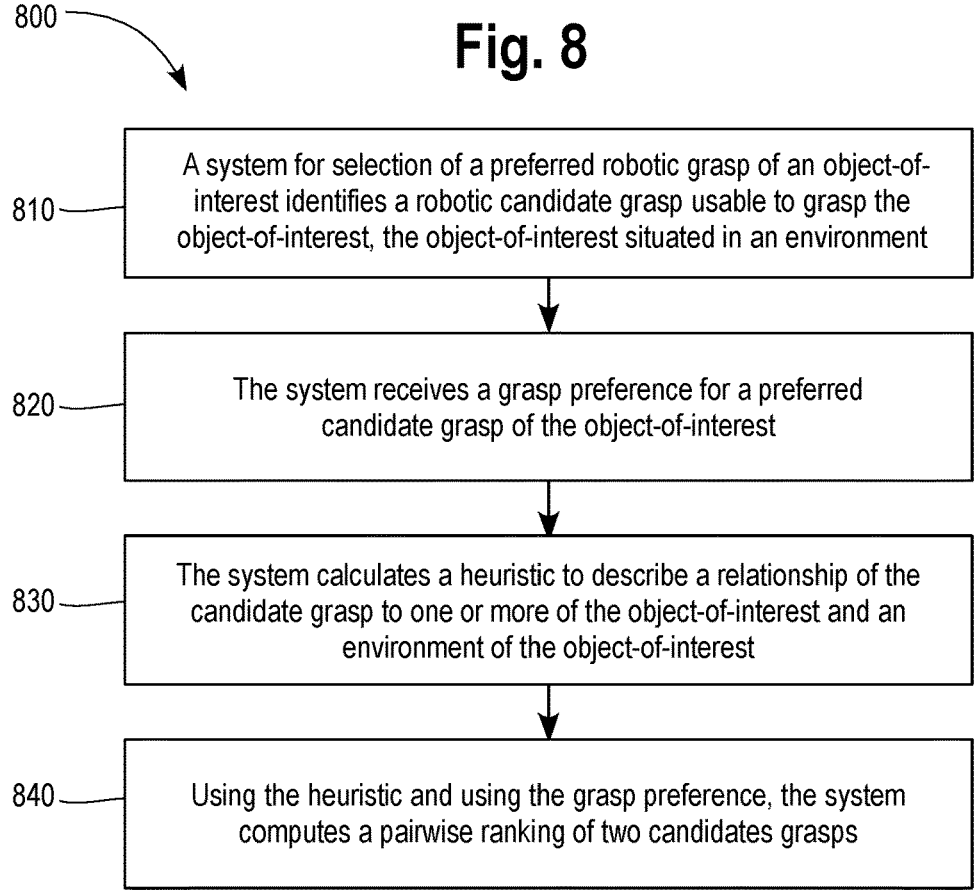
FIG. 8 is a flowchart of a method for selecting a preferred robotic grasp of an object-of-interest using pairwise ranking.

FIG. 8 is a flowchart of a method 800 for selecting a preferred robotic grasp of an object-of-interest using pairwise ranking. The order of steps in the method 800 is not constrained to that shown in FIG. 8 or described in the following discussion. Several of the steps could occur in different order without affecting the final result.

In step 810, a system for selection of a preferred robotic grasp of an object-of-interest-of-interest identifies a robotic candidate grasp usable to grasp the object-of-interest, the object-of-interest situated in an environment. For example, the identifying step comprises sampling the candidate grasp. For example, the identifying step comprises using the sampling to identify the candidate grasp. For example, the identifying step comprises a sub-step of receiving a grasp sampling strategy to be used in sampling. For example, the grasp sampling strategy is received from a user. For example, the identifying step comprises using the grasp sampling strategy. Block 810 then transfers control to block 820.

In step 820, the system receives a grasp preference for a preferred candidate grasp of the object-of-interest. For example, the system receives the grasp preference from a user. For example, the receiving step comprises receiving one or more of an object-of-interest point cloud ($PC_O$) representing the object-of-interest, and receiving an environment point cloud ($PC_E$) representing the environment. For example, the one or more of the $PC_O$ and the $PC_E$ is received from one or more of a stereo camera and a time-of-flight camera. Block 820 then transfers control to block 830.

In step 830, the system calculates a heuristic to describe a relationship of the candidate grasp to one or more of the object-of-interest and the environment. For example, the calculating step comprises using context data to calculate the heuristic. Block 830 then transfers control to block 840.

In step 840, using the heuristic and using the grasp preference, the system computes a pairwise ranking of two candidate grasps. For example, computing comprises finding a grasp characteristic describing a salient aspect of the grasp preference. For example, the grasp characteristic comprises one or more of a preference to grasp a center of the object-of-interest, a preference to grasp a handle of the object-of-interest, a preference to grasp a side of the object-of-interest, a preference for a candidate grasp approximately perpendicular to a large surface in the environment, a preference to exclude a candidate grasp that does one or more of collide with the environment and come within a user-specified margin of colliding with the environment. For example, the margin comprises one or more of a percentage and a distance. Block 840 then terminates the process.

For example, the method for selecting a preferred robotic grasp of an object-of-interest using pairwise ranking comprises an additional step, performed before the calculating step, of receiving context data regarding one or more of the object-of-interest and the environment. For example, the system receives the context data from the user. For example, the system receives the context data from another source other than the user. For example, a graphical user interface (GUI) receives the user's grasp preference. For example, the GUI receives the context data.

For example, the method for selecting a preferred robotic grasp of an object-of-interest comprises an additional step, performed after the computing step, of, using the pairwise ranking, determining an ordering of the candidate grasps.

V. Advantages

With minimal training data, the inventive pairwise ranking implementation for automatic grasp selection outperforms state-of-the-art automatic grasp selection approaches. For both novel objects and for trained objects, embodiments of the invention using pairwise rankings perform better than any of the three prior art approaches.

Embodiments of the invention using pairwise training data require only relative differences in grasp quality, not absolute values of grasp quality as required by prior art approaches. Also, a voting formulation pursuant to embodiments of the invention provides robustness to misclassifications from the binary classifier, as any misclassification has a chance to be mitigated by classifying the reverse-ordered pair. Embodiments of the invention attain grasp success rate improvements for objects that were the most difficult for the first three prior art methods.

One advantage of embodiments of the invention is their adaptability. The pairwise model trained on an initial object-of-interest set has some generalization to novel objects, resulting in improvements over the set of baseline methods. As such, the model can be used effectively for many objects without additional training. In the event that the robot encounters a complex new object, the classification model can be updated with training data collected specifically for that object, so as to develop an object-tailored grasping strategy. This can be done with a minimal amount of data collection due to the advantages of the pairwise ranking formulation.

The pairwise ranking formulation significantly reduces training data collection, while using object-of-interest features rather than objects themselves, allowing embodiments of the invention to be applied to novel objects. Embodiments of the invention have the advantage of flexibility, as even when the user simply selects a decent candidate grasp instead of the optimal candidate grasp from the candidate list, the majority of training instances generated by embodiments of the invention will still correctly reflect the grasp preference.

One advantage offered by embodiments of the invention is that using object-of-interest features allows the inventive method to be generally applicable to new objects. Grasp preferences based on an individual object-of-interest and learned from that object-of-interest can be applied to evaluate candidate grasps of objects that are one or more of new and different. By associating a user's grasp preferences with combinations of object-of-interest features, results generated by embodiments of the invention can be generalized to objects that are one or more of new and different.

According to embodiments of the invention, an approach is provided that incorporates the object-focused advantages of database methods with the generalizability of automatic grasp calculation in one method, without a requirement of explicit object modeling.

According to embodiments of the invention, a robot can effectively grasp unknown objects without a requirement of one or more of prior knowledge and semantic information. According to further embodiments of the invention, a robot can effectively grasp unknown objects without information on one or more of a weight of an object-of-interest and a purpose of an object-of-interest. A related advantage of embodiments of the invention is that the large amount of data required for prior art explicit object modeling is avoided, as is the requirement for a model of each type of object-of-interest to be grasped.

For example, it will be understood by those skilled in the art that software used by the method and system for pairwise ranking for automatic selection of a preferred robotic grasp of an object-of-interest-of-interest may be located in any location in which it may be accessed by the device. It will be further understood by those of skill in the art that the number of variations of the method and device are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

We claim:

1. A method for selecting a preferred robotic grasp of an object-of-interest using pairwise ranking, comprising:
   identifying, by a robot having a robotic manipulator a candidate grasp usable to grasp the object-of-interest by the robotic manipulator, the object-of-interest situated in an environment;
   receiving, by the robot, a grasp preference for a preferred candidate grasp of the object-of-interest;
   calculating, by the robot, a heuristic to describe a relationship of the candidate grasp to one or more of the object-of-interest and the environment, wherein the heuristic is calculated based at least in part on an object point cloud and object color; and
   using the heuristic and using the grasp preference, computing, by the robot, a pairwise ranking of two candidate grasps.

2. The method of claim 1, wherein the robotic manipulator comprises one or more of a robotic hand and a vacuum gripper.

3. The method of claim 1, wherein the environment comprises one or more of a table and a wall.

4. The method of claim 1, wherein the identifying step comprises sampling the candidate grasp.

5. The method of claim 4, wherein the identifying step comprises using the sampling to identify the candidate grasp.

6. The method of claim 1, wherein the identifying step comprises excluding candidate grasps that do one or more of collide with the environment and come within a user-specified margin of colliding with the environment.

7. The method of claim 6, wherein the user-specified margin comprises one or more of a percentage and a distance.

8. The method of claim 1, wherein the identifying step comprises a sub-step of: receiving a grasp sampling strategy to be used in sampling.

9. The method of claim 8, wherein the sub-step of receiving the grasp sampling strategy comprises receiving the grasp sampling strategy from a user.

10. The method of claim 8, wherein the identifying step comprises using the grasp sampling strategy.

11. The method of claim 10, wherein the grasp sampling strategy comprises one or more of a height accumulated feature sampler, a handle-like sampler, and an antipodal grasp sampler.

12. The method of claim 11, wherein the antipodal grasp sampler comprises an antipodal grasp sampler included in an Agile grasp Robot Operating System (ROS) package.

13. The method of claim 1, wherein the receiving step comprises receiving the grasp preference from a user.

14. The method of claim 1, wherein the receiving step is performed by a graphical user interface (GUI).

15. The method of claim 14, wherein, using the GUI, the system generates a visualization of a set of candidate grasps.

16. The method of claim 15, wherein the system generates the visualization of the set of candidate grasps using the grasp sampling strategy.

17. The method of claim 16, wherein the system receives from the user a selection from the set of candidate grasps of a best candidate grasp of the object-of-interest in the environment.

18. The method of claim 17, wherein the method is conducted multiple times for at least one object in a trained object set.

19. The method of claim 18, wherein the method is conducted multiple times for each object in the trained object set.

20. The method of claim 1, wherein computing comprises finding a grasp characteristic describing a salient aspect of the grasp preference.

21. The method of claim 1, wherein the grasp characteristic comprises one or more of a preference to grasp a center of the object-of-interest, a preference to grasp a handle of the object-of-interest, a preference to grasp a side of the object-of-interest, a preference for a candidate grasp approximately perpendicular to a large surface in the environment, a preference to exclude a candidate grasp that does one or more of collide with the environment and come within a user-specified margin of colliding with the environment.

22. The method of claim 21, wherein the user-specified margin comprises one or more of a percentage and a distance.

23. The method of claim 1, wherein the heuristic describes a relationship of each candidate grasp to one of more of the object-of-interest and the environment.

24. The method of claim 1, wherein the heuristic describes a relationship of the candidate grasp to the object-of-interest, and wherein the heuristic further describes a relationship of the candidate grasp to the environment.

25. The method of claim 1, wherein the calculating step comprises calculating one or more of an object feature and an environment feature.

26. The method of claim 25, wherein the object feature comprises one or more of a size, a shape, the color, a surface texture, an object-of-interest label, an object-of-interest surface feature, a color histogram, a point feature histogram, and another feature.

27. The method of claim 26, wherein color is represented in the color space of the Commission Internationale de l'Eclairage Lab (CIELAB).

28. The method of claim 25, wherein the environment feature comprises one or more of a size, a shape, a color, a surface texture, a label of the environment, a surface feature of the environment, a color histogram, a point feature histogram, and another feature of the environment.

29. The method of claim 1, wherein the heuristic comprises an orientation of the candidate grasp relative to the object-of-interest.

30. The method of claim 1, wherein the heuristic comprises an orientation of the candidate grasp as the robot grasps the object-of-interest at a grasp point.

31. The method of claim 1, wherein the heuristic is scaled.

32. The method of claim 31, wherein the heuristic is scaled so that the heuristic is not less than zero, and wherein the heuristic is further scaled so that the heuristic is not greater than one.

33. The method of claim 1, wherein the heuristic comprises $h_1$, wherein $h_1$ is defined as a difference between the candidate grasp orientation and a normal to a principal plane of the environment.

34. The method of claim 33, wherein the principal plane of the environment is fit over $PC_E$.

35. The method of claim 1, wherein the heuristic comprises $h_2$, wherein $h_2$ is defined as a difference between the candidate grasp orientation and a normal to a principal plane of the object-of-interest.

36. The method of claim 35, wherein the principal plane of the object-of-interest is fit over a local region of $PC_O$.

37. The method of claim 36, wherein the local region has an approximate center at the grasp point.

38. The method of claim 1, wherein the heuristic comprises $h_3$, wherein $h_3$ is defined as a difference between the candidate grasp orientation and a principal axis of $PC_O$.

39. The method of claim 1, wherein the heuristic comprises $h_4$, wherein $h_4$ is defined as a distance between the center of $PC_O$ and the grasp point.

40. The method of claim 1, wherein the heuristic comprises $h_5$, wherein $h_5$ is defined as a distance between the grasp point and the nearest point in $PC_O$.

41. The method of claim 40, wherein candidate grasps centered on a point touching the object-of-interest are preferred over candidate grasps centered on a point not touching the object-of-interest.

42. The method of claim 1, wherein the heuristic comprises one or more of $h_1$, $h_2$, $h_3$, $h_4$, and $h_5$, wherein $h_1$ is defined as a difference between the candidate grasp orientation and a normal to a principal plane of the environment, wherein $h_2$ is defined as a difference between the candidate grasp orientation and a normal to a principal plane of the object-of-interest, wherein $h_3$ is defined as a difference between the grasp orientation and a principal axis of $PC_O$, wherein Nis defined as a distance between the center of $PC_O$ and the grasp point $h_5$, and wherein $h_5$ is defined as a distance between the grasp point and the nearest point in $PC_O$.

43. The method of claim 42, wherein a combined heuristic $h_1$ calculates a quality of a candidate grasp i as a linear combination of heuristics $h_1$, $h_2$, $h_3$, $h_4$, and $h_5$:

$$h_i = w_1 h_i^1 + w_2 h_i^2 + w_3 h_i^3 + w_4 h_i^4 + w_5 h_i^5, \quad (1)$$

where $0 \leq w_n \leq 1$ and $\Sigma_n w_n = 1$, and where the weight $w_i$ represents an importance to the user of a heuristic $h_i$.

44. The method of claim 1, wherein the computing step comprises producing a final ranked grasp list using a voting method in which pairwise rankings are tabulated and a highest rank candidate grasp comprises a candidate grasp that was a preferred candidate grasp in the highest number of pairwise rankings.

45. The method of claim 1, wherein the method comprises an additional step, performed before the calculating step, of:
receiving context data regarding one or more of the object-of-interest and the environment.

46. The method of claim 45, wherein the step of receiving the context data comprises receiving the context data from the user.

47. The method of claim 45, wherein the step of receiving the context data comprises receiving one or more of the $PC_O$ and the $PC_E$.

48. The method of claim 47, wherein the step of receiving the context data further comprises receiving the one or more of the $PC_O$ and the $PC_E$ from one or more of a stereo camera and a time-of-flight camera.

49. The method of claim 45, wherein the calculating step comprises using the context data to calculate the heuristic.

50. The method of claim 45, wherein the step of receiving the context data comprises receiving one or more of an object-of-interest point cloud ($PC_O$) comprising one or more of an object point in the object-of-interest and the object color of the object-of-interest point, and an environment point cloud ($PC_E$) comprising one or more of an environment point in the environment in which the object-of-interest is situated and an environment point color of the environment point.

51. The method of claim 45, wherein the step of receiving the context data is performed by a graphical user interface (GUI).

52. The method of claim 1, wherein the calculating step comprises a sub-step of:
representing an ith candidate grasp $g_i$ by an ith grasp vector
$x_i = \{h_i^1, h_i^2, h_i^3, h_i^4, h_i^5\}$, wherein the ith grasp vector $x_i$ comprises a grasp characteristic of the ith candidate grasp $g_i$ in relation to one or more of the object-of-interest and the environment.

53. The method of claim 52, wherein the calculating step further comprises a sub-step of:
representing a jth candidate grasp $g_j$ by a jth grasp vector $x_j = \{h_j^1, h_j^2, h_j^3, h_j^4, h_j^5\}$, wherein the jth grasp vector $x_j$ comprises a grasp characteristic of the jth candidate grasp $g_j$ in relation to one or more of the object-of-interest and the environment.

54. The method of claim 53, wherein the calculating step further comprises a sub-step, performed after both steps of representing candidate grasps by grasp vectors, of:
computing a pairwise vector $\{\hat{x}\}_{ij}$ by taking a difference of the grasp vectors:

$$\{\hat{x}\}_{ij} = \{x_i - x_j\}, \qquad (2)$$

wherein the pairwise vector $\{\hat{x}\}_{ij}$ indicates, for each of the five heuristics ($h_1$, $h_2$, $h_3$, $h_4$, and $h_5$) how the candidate grasps differ.

55. The method of claim 54, wherein the calculating step further comprises, using the context data, computing from the object-of-interest point cloud $PC_O$, an object vector $f_{ij}$, comprising object-of-interest features $f_0, f_1, \ldots, f_n$:

$$f_{ij} = \{f_0, f_1, \ldots, f_n\} \qquad (3).$$

56. The method of claim 55, wherein the calculating step further comprises appending the pairwise vector $\{\hat{x}\}_{ij}$ to the object vector $f_{ij}$, to create a enhanced vector $x_{ij}$:

$$x_{ij} = \{f_0, f_1, \ldots, f_n, \{\hat{x}\}_{ij}\} \qquad (4),$$

wherein the enhanced vector $x_{ij}$ comprises information comparing two candidate grasps and relating them to the object-of-interest.

57. The method of claim 56, wherein the calculating step further comprises, using the grasp preference, creating a grasp preference label $y_{ij}$ that denotes an ordering of the two candidate grasps $g_i$ and $g_j$, wherein a grasp preference label $y_{ij}$ of 1 indicates a grasp preference for $g_i$ over $g_j$, and a grasp preference label $y_{ij}$ of 0 indicates a grasp preference for $g_j$ over $g_i$.

58. The method of claim 1, wherein the computing step further comprises training a binary classifier to predict a candidate grasp ordering.

59. The method of claim 1, further comprising an additional step, performed after the computing step, of:
using the pairwise ranking, determining an ordering of the candidate grasps.

60. The method of claim 1, further comprising an additional step, performed after the computing step, of, using the trained binary classifier, predicting a pairwise ranking for a candidate grasp of a novel object.

61. The method of claim 60, wherein the predicting step comprises a sub-step of, using the candidate grasps, computing the enhanced vector $x_{ij}$.

62. The method of claim 61, wherein the predicting step comprises a sub-step, performed after the sub-step of computing the enhanced vector $x_{ij}$, using the trained binary classifier, predicting a grasp preference label $y_{ij}$ for a candidate grasp of the novel object.

63. The method of claim 62, wherein the predicting step comprises a sub-step, performed after the sub-step of predicting the grasp preference label $y_{ij}$ for a candidate grasp of the novel object, of, using the user grasp preference, predicting a preferred candidate grasp from new candidate grasps for which the user has not provided any grasp preference.

64. The method of claim 1, wherein the method comprises an additional step, performed after the computing step, of training a binary classifier to predict a grasp preference, thereby predicting a candidate grasp ordering.

65. The method of claim 64, wherein the binary classifier comprises one or more of a binary random forest classifier, a neural network classifier, and a k nearest neighbors classifier.

66. The method of claim 64, wherein the method comprises an additional step, performed after the training step, of, using a user grasp preference, predicting a preferred candidate grasp from new candidate grasps for which the user has not provided any grasp preference.

67. The method of claim 66, wherein the predicting step comprises producing a ranked candidate grasp list using a voting method in which pairwise rankings are tabulated and a highest rank candidate grasp comprises a candidate grasp that was a preferred candidate grasp in the highest number of pairwise rankings.

68. The method of claim 67, wherein the ranked candidate grasp list comprises feedback ranking data generated when a user performs one or more of selecting a candidate grasp, executing the candidate grasp, and ranking the candidate grasp, the feedback ranking data being applied to improve candidate grasp rankings.

69. The method of claim 68, wherein selecting the candidate grasp and ranking the candidate grasp are a combined single operation.

70. The method of claim 69, wherein the system is configured to suggest to the user a highest ranking candidate grasp.

71. The method of claim 1, wherein the system is configured to search using as a query the object-of-interest, returning as a search result a preferred candidate grasp.

* * * * *